(12) United States Patent
Kumashio

(10) Patent No.: US 7,535,586 B2
(45) Date of Patent: May 19, 2009

(54) INFORMATION PROCESSING DEVICE, PRINTING DEVICE, PRINT DATA TRANSMISSION METHOD, PRINTING METHOD, PRINT DATA TRANSMITTING PROGRAM, AND RECORDING MEDIUM

(75) Inventor: Hiroya Kumashio, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 980 days.

(21) Appl. No.: 10/942,918

(22) Filed: Sep. 17, 2004

(65) Prior Publication Data

US 2005/0062998 A1 Mar. 24, 2005

(30) Foreign Application Priority Data

Sep. 22, 2003 (JP) ............... 2003-330578

(51) Int. Cl.
*G06K 15/00* (2006.01)
*G06F 3/12* (2006.01)

(52) U.S. Cl. .................... 358/1.14; 358/1.15

(58) Field of Classification Search ............ 358/1.15, 358/1.14, 1.13, 1.1, 1.11, 1.2, 1.5, 1.6, 1.9, 358/1.16, 1.17, 1.18, 401, 426.02, 426.03, 358/426.04, 426.06, 426.07, 426.08, 426.09, 358/426.11, 426.12, 434, 435, 436, 437, 358/438, 439, 442, 468; 380/201, 203, 243, 380/273, 277, 278, 279, 281, 282, 283, 284, 380/285, 286, 44, 45, 30, 51, 55; 713/153, 713/160, 162, 171, 182, 187, 189, 150; 399/1, 399/8; 347/2, 3, 5, 14, 23

See application file for complete search history.

(56) References Cited

U.S. PATENT DOCUMENTS 5,432,850 A 7/1995 Rothenberg 6,782,387 B1 8/2004 Kumashio
2002/0036789 A1 3/2002 Iwasaki (Continued)

FOREIGN PATENT DOCUMENTS

JP 11-122237 4/1999

(Continued)

OTHER PUBLICATIONS

U.S. Appl. No. 10/280,032, filed Oct. 25, 2002, Yoshida, et al.

(Continued)

*Primary Examiner*—Dov Popovici
(74) *Attorney, Agent, or Firm*—Oblon, Spivak, McClelland, Maier & Neustadt, P.C.

(57) ABSTRACT

An information processing device is provided to transmit print information securely to a printing device, and a printing device is provided to print out the information transmitted from the information processing device. The information processing device transmits print data to the printing device connected via a network. The information processing device includes: an encryption key generating part that generates an encryption key to be used to encrypt the print data, based on inherent information that is unique to the printing device and is represented by a fixed value; and an encrypting part that encrypts at least part of the print data, using the encryption key generated by the encryption key generating part. The print data encrypted by the encrypting part are transmitted to the printing device.

28 Claims, 17 Drawing Sheets

U.S. PATENT DOCUMENTS

| | | |
|---|---|---|
| 2003/0059051 A1 | 3/2003 | Hatano et al. |
| 2003/0090717 A1 | 5/2003 | Yoshida et al. |

FOREIGN PATENT DOCUMENTS

| | | | |
|---|---|---|---|
| JP | 2001-211148 | | 8/2001 |
| JP | 2003-110543 | | 4/2003 |
| JP | 2003-223305 | | 8/2003 |
| JP | 2003-241953 | | 8/2003 |
| JP | 2003241953 | * | 8/2003 |
| WO | WO 02/39661 A2 | | 5/2002 |
| WO | WO0239661 | * | 5/2002 |

OTHER PUBLICATIONS

U.S. Appl. No. 10/051,278, filed Jan. 22, 2002, Kumashio.
U.S. Appl. No. 10/601,645, filed Jun. 24, 2003, Matsuishi.
A. K. Choudhury, et al., "Copyright Protection for Electronic Publishing Over Computer Networks", IEEE Network, vol. 9, No. 3, XP 000505280, May 1, 1995, pp. 12-20.

* cited by examiner

PRINTER NAME
PRINTER A ▽

DOCUMENT PASSWORD
ABCDEFG0123456 ～171

MAC ADDRESS
00:11:22:AA:BB:CC

PRINT PASSWORD
0123456ABCDEF

172
OK    CANCEL

INFORMATION PROCESSING DEVICE, PRINTING DEVICE, PRINT DATA TRANSMISSION METHOD, PRINTING METHOD, PRINT DATA TRANSMITTING PROGRAM, AND RECORDING MEDIUM

BACKGROUND OF THE INVENTION

1. Field of the Invention

The present invention relates to an information processing device that transmits print data to a printing device such as a printer, a print data transmission method, a print data transmitting program, and a recording medium.

The present invention also relates to a printing device that prints out the print data transmitted from the information processing device, and a printing method that is performed by the printing device.

2. Description of the Related Art

As network data transmission has been rapidly developed and is now widely used, more attention has been drawn to encryption techniques for transmitting data securely over a network, as is disclosed in Japanese Laid-Open Patent Application No. 2001-211148. By encrypting data prior to transmission, the original plain text can be prevented from being transmitted over the network, and it becomes difficult for an ill-mannered user to gain access by performing wire tapping or the like.

When document data are printed out, the same problem as the above occurs in transmitting the print data from a device such as a personal computer (PC) to a printer. There is a possibility that the print data that are being transmitted from the PC might be wrongfully intercepted and sent to a printer that is not the originally selected printer. To counter this problem, the print data should be encrypted in the PC; and the encrypted print data are transmitted to the printer. Such a printing system can give more security to data transmission.

The encryption techniques can be roughly divided into common key encryption (symmetrical key encryption) methods and public key encryption (asymmetrical key encryption) methods. The former methods include DES and RC4 in which the same key is used for encryption and decryption. The latter methods include RSA in which a public key and a private key are used, and the encryption key and the decryption key are different.

By any of the common key decryption methods, however, encrypted data can be easily decrypted, once the decryption key is stolen. Therefore, the management and delivery of the encryption key become very important. By any of the public key decryption methods, on the other hand, only the public key is delivered to the receiving end, and the private key need not be delivered. Accordingly, a public key encryption method is safer than a common key encryption method. With a public key encryption method, however, there are drawbacks that it is necessary to employ a complicated mechanism to perform bidirectional communication between a PC and a printer, and that the operation speed is low as a large amount of arithmetic operations is involved in encryption and decryption.

Therefore, a common key encryption method is considered to be more suitable for the above described printing system, because of its readiness for mounting and greater processing capacity.

By a common key encryption method, however, it is necessary to use the same key at both the encrypting side and the decrypting side. Therefore, the encryption key as well as encrypted print data need to be transmitted from the encrypting side to the decrypting side, or identical keys should be stored in advance on both sides.

In the former case, the encryption key might be easily stolen, in which case the encryption of print data becomes pointless.

In the latter case, the possibility of the encryption key being stolen is reduced. However, if there are two or more printers with the same encryption keys, print data can be decrypted by any of these printers including one that is not the selected printer.

SUMMARY OF THE INVENTION

A general object of the present invention is to provide an information processing device and a printing device in which the above disadvantages are eliminated.

A more specific object of the present invention is to provide an information processing device that can transmit print information securely to a printing device, and a printing device that can print out the print information transmitted from the information processing device.

The above objects of the present invention are achieved by an information processing device that transmits print data to a printing device that is connected to the information processing device via a network. This information processing device includes: an encryption key generating part that generates an encryption key to be used to encrypt the print data, based on inherent information that is unique to the printing device and is represented by a fixed value; and an encrypting part that encrypts at least part of the print data, using the encryption key generated by the encryption key generating part. The print data encrypted by the encrypting part are transmitted to the printing device.

In this information processing device, print data to be transmitted to a printing device such as a printer are encrypted, based on information that is unique to the printing device. Thus, the information processing device can transmit print data that are difficult for any other device to decrypt.

The above objects of the present invention are also achieved by a printing device that receives encrypted print data from an information processing device connected to the printing device via a network, and prints out the print data. This printing device includes: a decryption key generating part that generates a decryption key to be used to decrypt the encrypted print data, based on inherent information that is unique to the printing device and is represented by a fixed value; and a decrypting part that decrypts the encrypted print data, based on the decryption key generated by the decryption key generating part. The print data decrypted by the decrypting part are then printed out.

This printing device can decrypt print data that have been encrypted based on information unique to the printing device by the above described information processing device. The printing device then prints out the decrypted print data.

The above objects of the present invention are also achieved by a print data transmission method to be performed by the above information processing device, a print data transmitting program for causing a computer to perform the print data transmission method, or a recording medium that records the print data transmitting program.

The above objects of the present invention are also achieved by a printing method to be performed by the printing device.

The above and other objects, features, and advantages of the present invention will become more apparent from the following detailed description taken in conjunction with the accompanying drawings.

BRIEF DESCRIPTION OF THE DRAWINGS

FIG. 15 shows an example of the input screen in the fourth embodiment;

DESCRIPTION OF THE PREFERRED EMBODIMENTS

The following is a description of embodiments of the present invention, with reference to the accompanying drawings.

Figure 1:
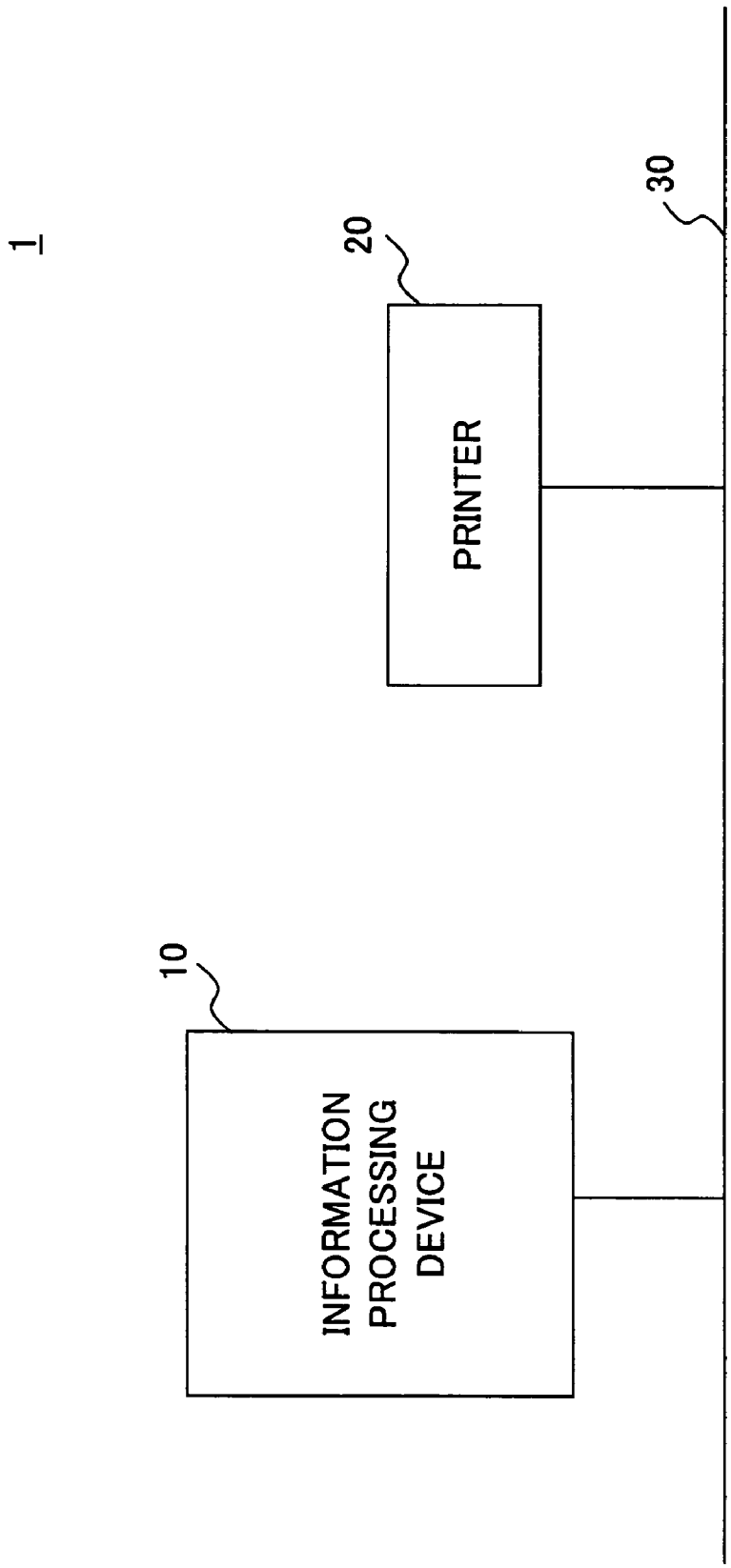
FIG. 1 is a block diagram of an example structure of a printing system in accordance with the present invention.

FIG. 1 illustrates the structure of a printing system in accordance with the present invention. As shown in FIG. 1, the printing system 1 includes an information processing device 10 and a printer 20 that are connected to each other via a network 30 such as the Internet or a LAN.

The information processing device 10 is a user device such as a personal computer (PC) that is operated directly by users. In accordance with a document data print instruction issued by a user, the information processing device 10 converts document data into print data that can be processed by the printer 20. The information processing device 10 then transmits the print data to the printer 20, and requests the printer 20 to print out the print data.

The printer 20 is a general purpose printer, and prints out the print data, which are transmitted from the information processing device 10, on a paper sheet.

Figure 2:
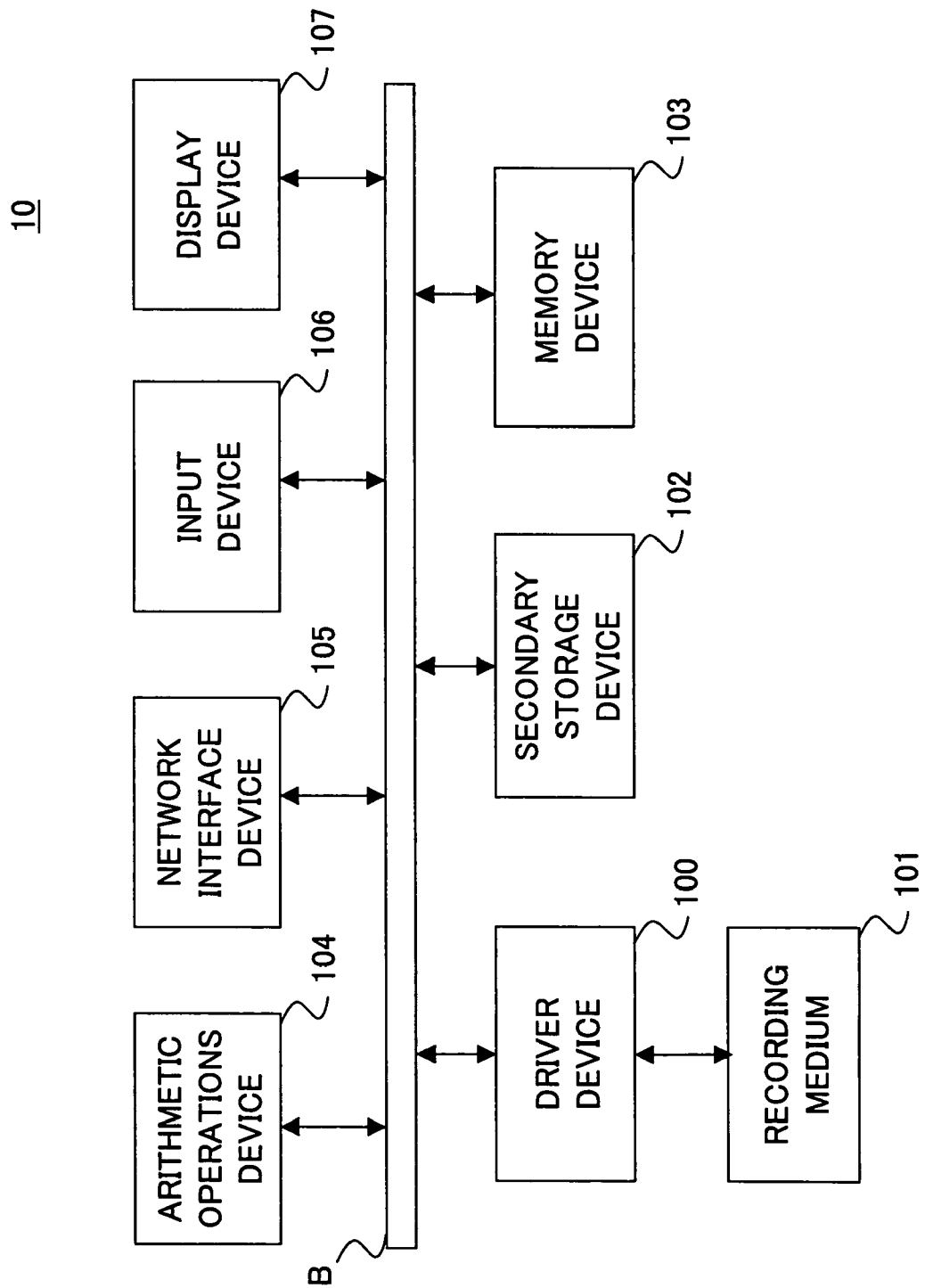
FIG. 2 is a block diagram of an information processing device in accordance with the present invention.

Next, the information processing device 10 is described in greater detail. FIG. 2 shows an example hardware structure of the information processing device 10 in accordance with the present invention. The information processing device 10 includes a driver device 100, a secondary storage device 102, a memory device 103, an arithmetic operations device 104, a network interface device 105, an input device 106, and a display device 107 that are connected to one another via a bus B.

A print data transmitting program that realizes operations of the information processing device 10 is provided by a recording medium 101 such as a CD-ROM. When the recording medium 101 having the print data transmitting program recorded thereon is set to the driver device 100, the print data transmitting program recorded on the recording medium 101 is installed in the secondary storage device 102 via the driver device 100. The secondary storage device 102 stores necessary files and data, as well as the installed print data transmitting program.

When there is an instruction to activate the print data transmitting program, the memory device 103 reads in the print data transmitting program from the secondary storage device 102. The arithmetic operations device 104 carries out operations of the information processing device 10, in accordance with the print data transmitting program stored in the memory device 103. The network interface device 105 may be formed with a modem or router, for example, and is used to connect to the network 30 shown in FIG. 1.

The input device 106 may be formed with a keyboard and a mouse, and is used to input various operations instructions. The display device 107 displays information using a graphical user interface (GUI) or the like, in accordance with the print data transmitting program.

Figure 3:
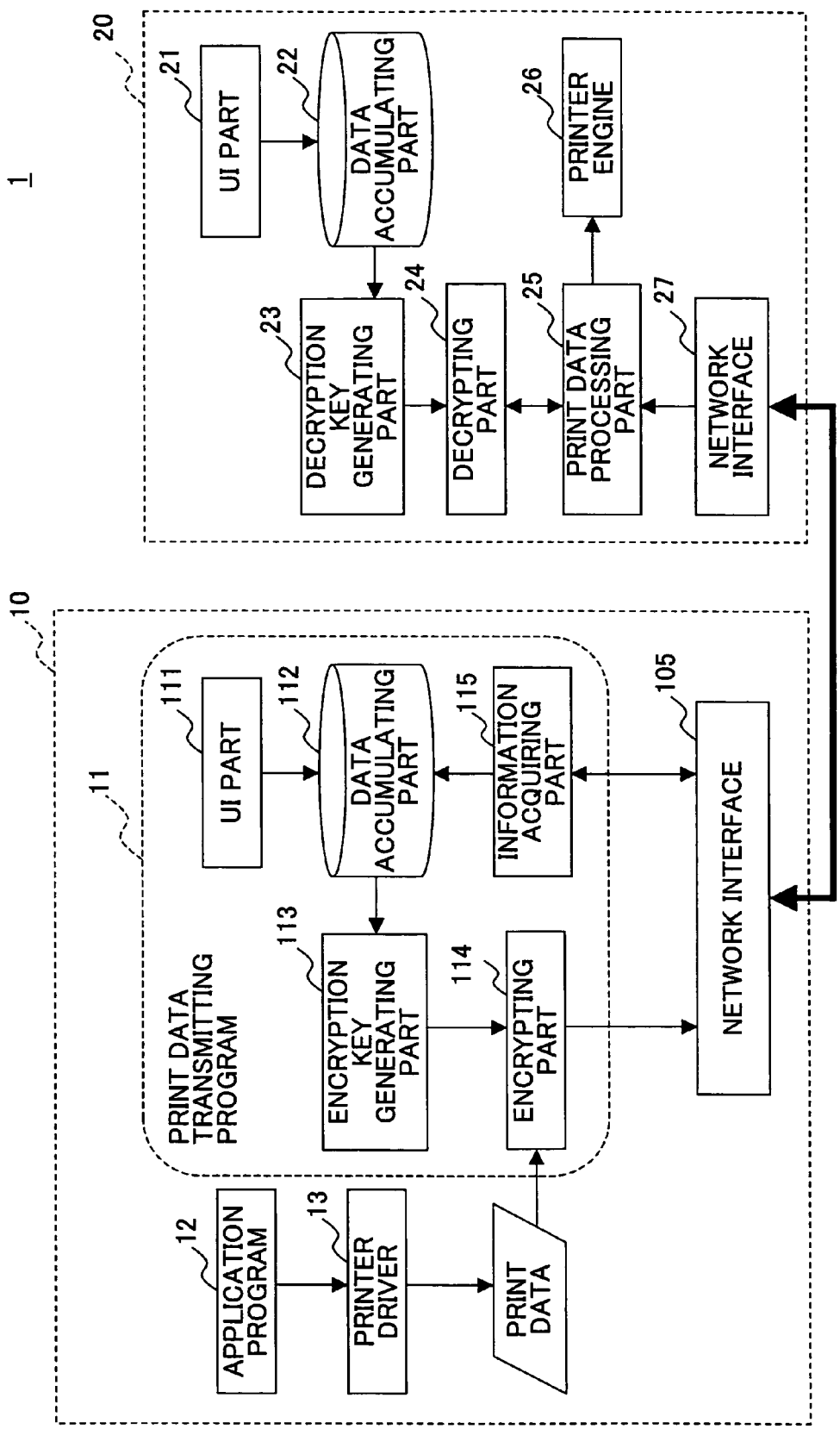
FIG. 3 shows an example functional structure of the printing system in accordance with the present invention.

FIG. 3 illustrates an example functional structure of the printing system in accordance with the present invention. As shown in FIG. 3, a print data transmitting program 11 is provided in the information processing device 10. The print data transmitting program 11 includes a user interface (UI) part 111, a data accumulating part 112, an encryption key generating part 113, an encrypting part 114, and an information acquiring part 115.

The UI part 111 controls the GUI to receive input from users. The data accumulating part 112 is a memory area in which inherent information that is unique to the printer 20 and is represented by a fixed value, such as the MAC address of the printer 20 to be used by the encryption key generating part 113 (described later in greater detail) to generate an encryption key, is stored, and is included in the secondary storage device 102.

The encryption key generating part 113 generates an encryption key, based on the information stored in the data accumulating part 112. In this embodiment, a common key encryption method is employed for ease of development and greater processing capacity.

The encrypting part 114 encrypts print data using the encryption key generated by the encryption key generating part 113, and transmits the encrypted print data (hereinafter referred to as the "encrypted data") to the printer 20. Here, the print data are generated by a printer driver 13 in accordance with a document data print instruction issued by a user to an application program 12 such as general purpose word-processing software, and are in such a format that can be decrypted by the printer 20.

The information acquiring part 115 requests the printer 20 to transmit the MAC address of the printer 20, and receives the MAC address from the printer 20.

The printer 20 includes a UI part 21, a data accumulating part 22, a decryption key generating part 23, a decrypting part 24, a print data processing part 25, a printer engine 26, and a network interface 27.

The UI part 21 controls the display on the operations panel of the printer 20. The data accumulating part 22 is a memory area in which information to be used by the decryption key generating part 23 (described later in greater detail) to generate a decryption key is stored in advance.

Based on the information stored in the data accumulating part 22, the decryption key generating part 23 generates a decryption key, using the same algorithm as the one used by the encryption key generating part 113 of the information processing device 10. As long as the same information are used, the decryption key generated by the decryption key generating part 23 and the encryption key generated by the encryption key generating part 113 are the same.

The decrypting part 24 decrypts the encrypted data transmitted from the information processing device 10, using the decryption key generated by the decryption key generating part 23.

The print data processing unit 25 controls the entire printing process to be carried out on the encrypted data transmitted from the information processing device 10. More specifically, the print data processing unit 25 causes the decrypting part 24 to decrypt the encrypted data, and causes the printer engine 26 to print out the print data generated through the decryption.

The printer engine 26 outputs (prints out) the print data onto a paper sheet. The network interface 27 is the same as the network interface device 105 of the information processing device 10.

Figure 4:
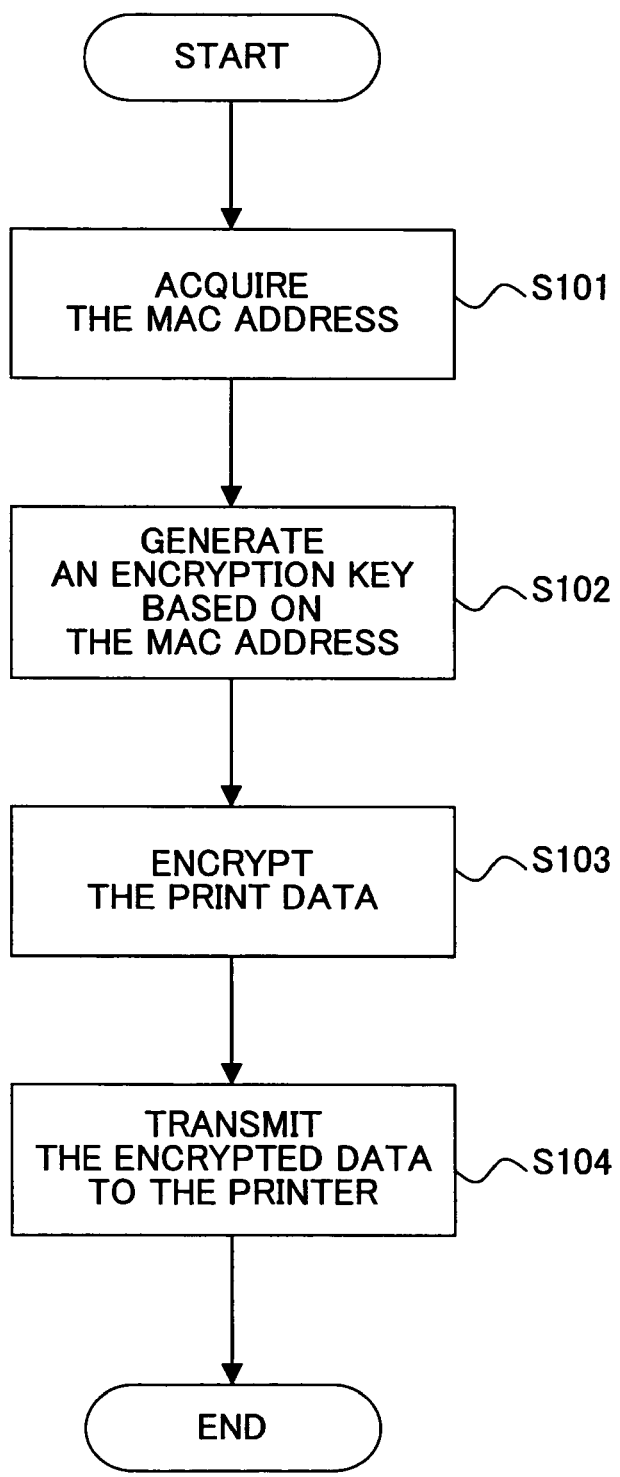
FIG. 4 is a flowchart of an operation to be performed by the information processing device in a first embodiment of the present invention.

In the following, the processing operation of the printing system 1 shown in FIG. 3 is described. FIG. 4 is a flowchart of an operation to be performed by the information processing device 10 in a first embodiment of the present invention. The operation shown in FIG. 4 is to be performed after the application program 12 carries out the document data printing process in accordance with an instruction from a user, and the printer driver 13 generates print data.

In step S101, the encryption key generating part 113 acquires the MAC address of the printer 20 stored in the data accumulating part 112.

Figure 5:
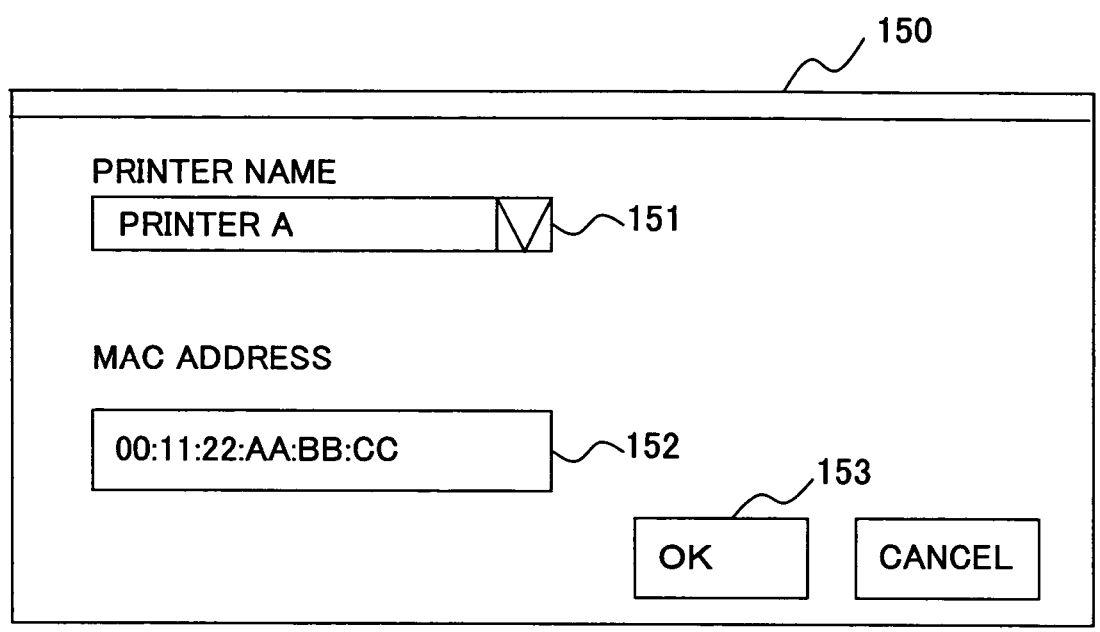
FIG. 5 shows an example of the input screen to be used by a user to input the MAC address of a selected printer.

The MAC address may be input by a user, with a screen image shown in FIG. 5 being displayed by the UI part 111. FIG. 5 shows an example of the input screen for prompting a user to input the MAC address of the selected printer. The input screen 150 shown in FIG. 5 includes a printer select area 151 and a MAC address input area 152. The printer select area 151 is a combo box to be used by a user to select a printer whose MAC address is to be input. The MAC address input area 152 is a text box in which a user inputs the MAC address of the selected printer. As a user inputs the MAC address and clicks an OK button 153 on the input screen 150, the MAC address is stored in the data accumulating part 112.

However, a user inputting a MAC address often leads to an error, resulting in poorer usability. To counter this problem, the information acquiring part 115 may automatically acquire the MAC address of the printer 20. In a case where a TCP/IP protocol is used as a communication protocol in the network 30, for example, an ARP (Address Resolution Protocol) that determines a MAC address from an IP address is used in the TCP/IP, thereby acquiring the MAC address of the selected device. Since the information processing device 10 is normally informed of the IP address of the printer 20 as a transmission destination (otherwise, the information processing device 10 cannot transmit print data to the printer 20), the information acquiring part 115 acquires the MAC address from the IP address of the printer 20, using the ARP, and then stores the MAC address in the data accumulating part 112.

Whether a user is inputting the MAC address or the information acquiring part 115 is automatically acquiring the MAC address, this address acquiring process may be carried out in advance or at least prior to step S101, when a print instruction is issued.

After step S101, the operation moves on to step S102. In step S102, the encryption key generating part 113 generates an encryption key based on the MAC address of the printer 20. As means to generate an encryption key from given data, a Message Digest algorithm that generates data of a predetermined length using a hash function is normally employed. Examples of the Message Digest algorithms that can be employed here include MD5 and SHA-1.

After step S102, the operation moves on to step S103. In step S103, the encrypting part 114 encrypts the print data, using the encryption key generated by the encryption key generating part 113. Examples of common key encrypting algorithms that can be employed here include DES and RC4.

If $MD_5$ is used to generate an encryption key while DES with a 56-bit key is used for encryption, 128-bit data are generated by MD5. The first 56 bits of the 128-bit data are cut off, and are used as an encryption key. More specifically, the MAC address of the printer 20 is converted into 128-bit data by MD5, and the first 56 bits of the 128-bit data are used as an encryption key. Using this encryption key, the encrypting part 114 encrypts the print data with DES.

Here, it is absolutely vital to hide the encryption key generating algorithm and the encrypting algorithm. In this embodiment, the encryption key generating algorithm and the encrypting algorithm are both incorporated into the print data transmitting program 11 and the printer 20 in advance, so as not to be directly referred to.

After step S103, the operation moves on to step S104. In step S104, the print data (the encrypted data) encrypted by the encrypting part 114 are transmitted to the printer 20 via the network interface device 105.

Figure 6:
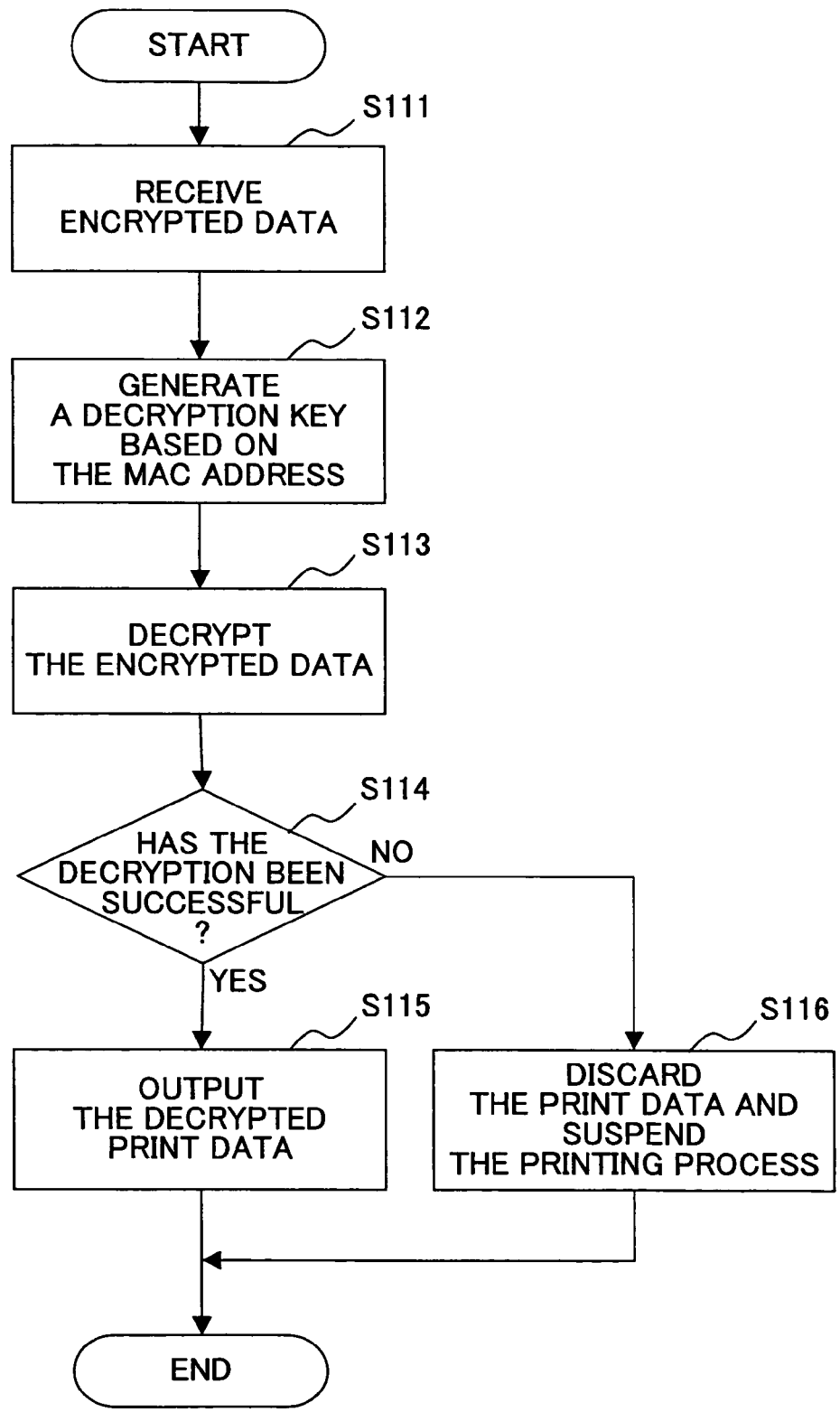
FIG. 6 is a flowchart of an operation to be performed by the printer in the first embodiment.

Next, the operation to be performed by the printer 20 is described. FIG. 6 is a flowchart of the operation to be performed by the printer 20 in the first embodiment of the present invention.

In step S111, the print data processing part 25 receives the encrypted data, which is transmitted from the information processing device 10 in step S104, via the network interface 27. In step S112, the decryption key generating part 23 acquires the MAC address of the printer 20, and generates a decryption key based on the MAC address. Here, the decryption key generating part 23 generates the decryption key, using the same key generating algorithm as the one used by the encryption key generating part 113 of the information processing device 10. Accordingly, the decryption key generating part 23 converts the MAC address into 128-bit data with MD5, and cuts off the first 56 bits from the 128-bit data. Thus, the decryption key generated in step S112 becomes the same as the encryption key generated by the encryption key generating part 113 in step S102.

The operation then moves on to step S113. In step S113, the decrypting part 24 decrypts the encrypted data with DES, using the decryption key generated by the decryption key generating part 23. Through this step, the print data are turned into the original plain text.

The operation next moves on to step S114. In step S114, the print data processing part 25 determines whether the print data have been successfully decrypted. In the case where the decryption has been successful, the print data processing part 25 causes the printer engine 25 to print out the print data in step S115. In the case where the decryption has not been successful, the print data processing part 25 discards the print data, and suspends the printing process in step S116.

As described above, in the printing system 1 of the first embodiment, the information processing device 10 and the printer 20 are not provided with an encryption key in advance, but each generates an encryption/decryption key, using the MAC address that is the information inherent in the printer 20. Accordingly, even if the print data are unjustly acquired during a communication and are transmitted to another printer, the printer that has unjustly received the print data cannot generate the correct encryption key and cannot perform proper printing. In this manner, anyone who tries to obtain information unjustly cannot have the print data printed out, unless he or she finds out how the encryption key is generated and which algorithm is used in the encrypting process.

Furthermore, as the encryption key is not to be transmitted in this embodiment, the probability of the encryption key being stolen is reduced accordingly. Also, as any complicated mechanism that is required by a public key encryption method is not employed in this embodiment, structuring the system is relatively easy.

In a case where tight security is not desired by users, however, the procedures such as the inputting of a MAC address are rather troublesome. Also, the information acquiring part 115 may fail to acquire the MAC address of a selected printer, due to a timeout or the like. For this reason, the value of a MAC address is not always recognized in the information processing device 10.

Figure 7:
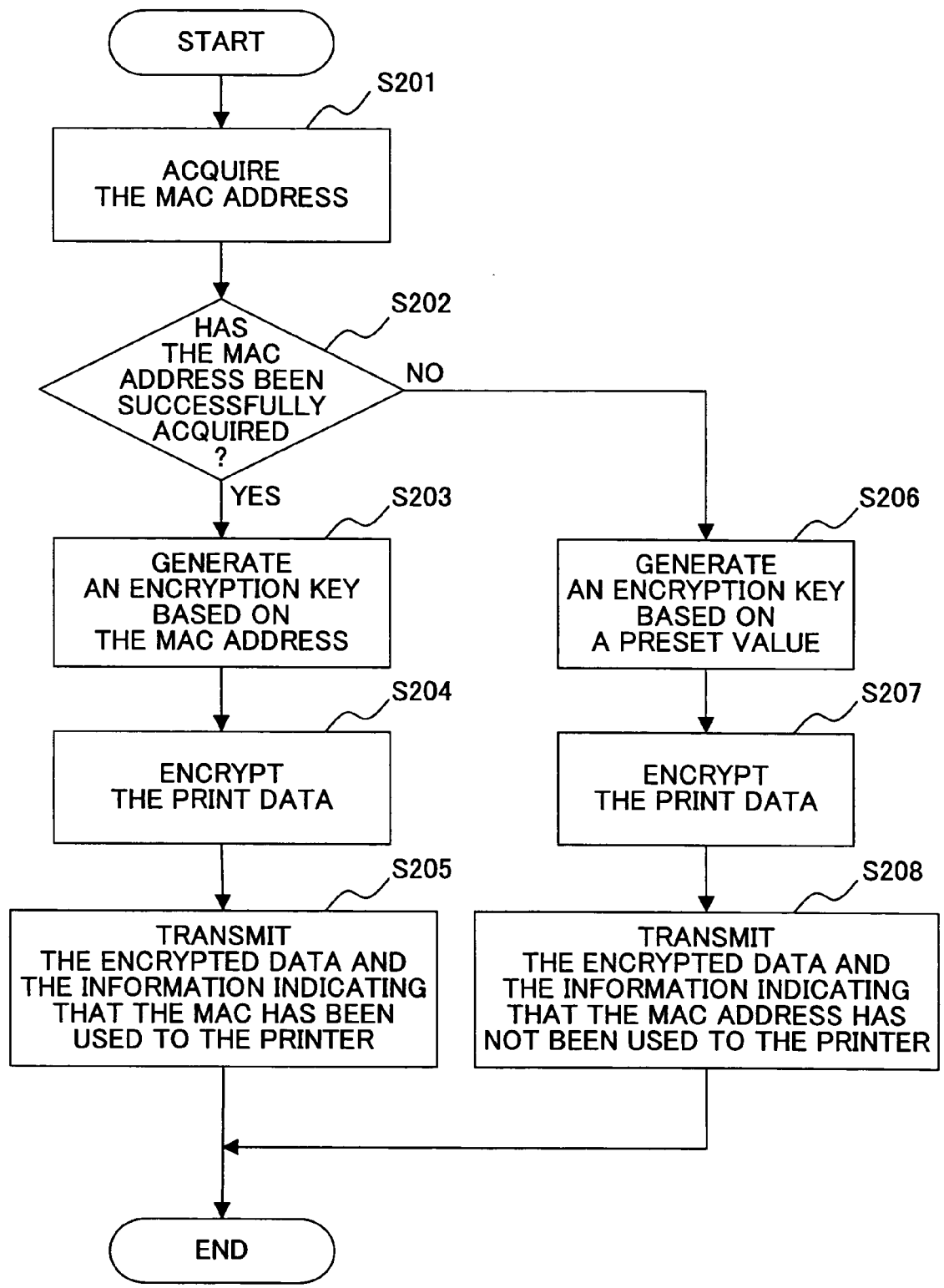
FIG. 7 is a flowchart of an operation to be performed by the information processing device in a second embodiment of the present invention.

To counter this problem, an operation that enables a printing process without a MAC address input or acquired is now described as a second embodiment of the present invention. FIG. 7 is a flowchart of the operation to be performed by the information processing device 10 in the second embodiment. The operation shown in FIG. 7 is performed in the same timing as the operation shown in FIG. 4.

In step S201, the encryption key generating part 113 acquires the MAC address of the printer 20 from the data accumulating part 112. In step S202, the encryption key generating part 113 determines whether the MAC address has been successfully acquired. In the case where the MAC address has been successfully acquired, the same procedures as steps S102 and S103 (FIG. 4) are carried out to generate an encryption key and to encrypt the print data in steps S203 and S204. As well as the encrypted data, the information indicating that the MAC address has been used to generate the encryption key is then transmitted to the printer 20 in step S205.

In the case where the MAC address has not been successfully acquired, the operation moves on to step S206 from step S202. In step S206, the encryption key generating part 113 generates an encryption key based on a preset value such as "00:00:00:00:00:00", instead of the MAC address. However, the key generating algorithm used here is the same as the key generating algorithm used to generate the encryption key based on the MAC address.

The operation then moves on to step S207. In step S207, the encrypting part 114 encrypts the print data, using the encryption key generated based on the preset value. The operation next moves on to step S208. In step S208, as well as the encrypted data encrypted by the encrypting part 114, the information indicating that the MAC address has not been used to generate the encryption key is transmitted to the printer 20.

Figure 8:
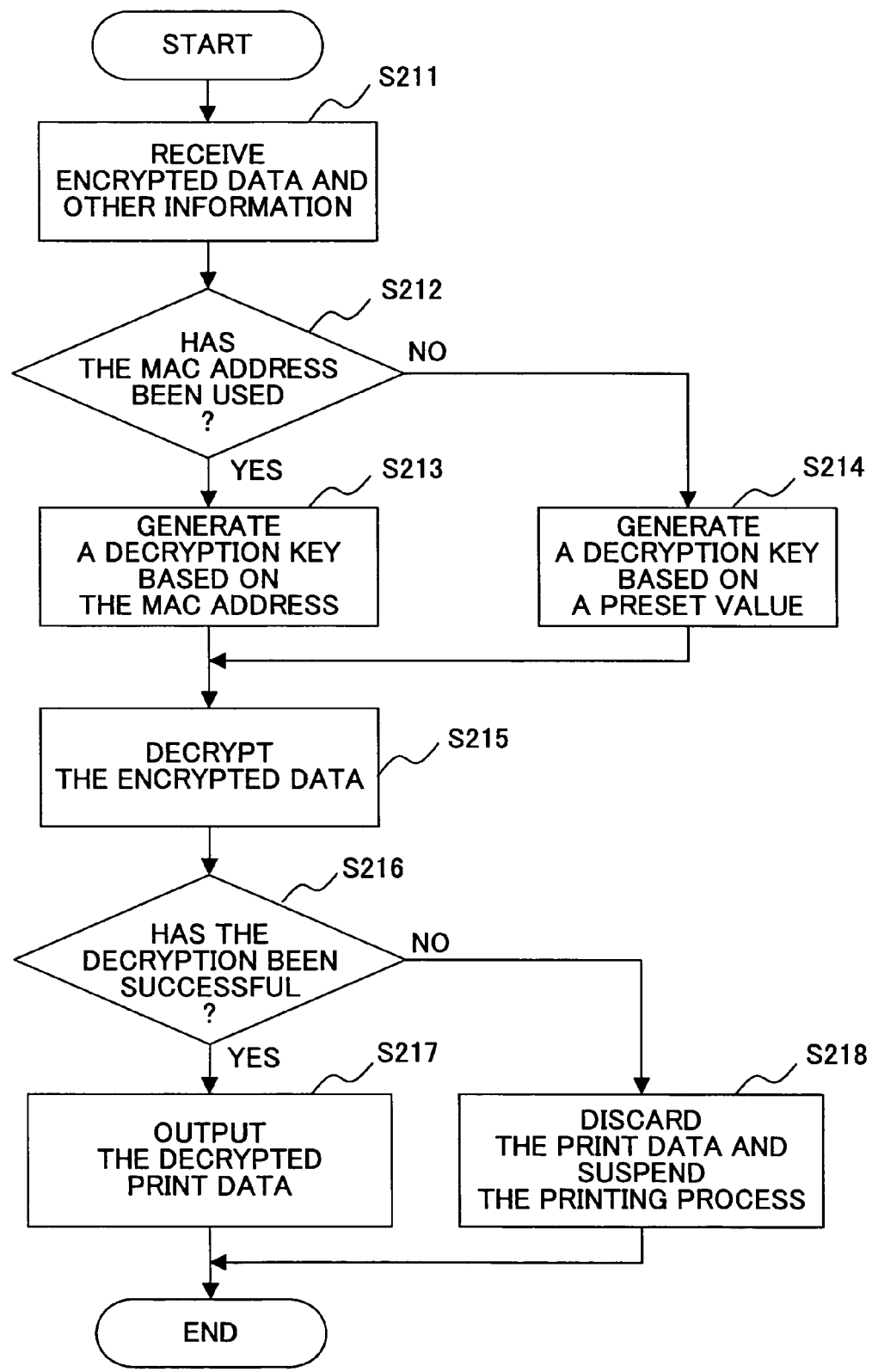
FIG. 8 is a flowchart of an operation to be performed by the printer in the second embodiment.

Next, the operation to be performed by the printer 20 is described. FIG. 8 is a flowchart of the operation to be performed by the printer 20 in the second embodiment.

In step S211, the print data processing part 25 receives the encrypted data and the information indicating whether the MAC address has been used to generate the encryption key (the information will be hereinafter referred to as the "MAC address use flag"). The print data processing part 25 receives the encrypted data and the MAC address use flag, which are transmitted from the information processing device 10 in step S206 or S208, via the network interface 27.

The operation then moves on to step S212. In step S212, the print data processing part 25 determines whether the MAC address has been used to generate the encryption key in the information processing device 10, based on the MAC address use flag.

In the case where the MAC address has been used, the operation moves on to step S213. The same procedures as steps S112 through S116 (FIG. 6) are then carried out to decrypt the encrypted data and to print out the decrypted print data in steps S213 through S218.

In the case where the MAC address has not been used, the operation moves on to step S214. In step S214, the decryption key generating part 23 generates a decryption key, based on the same preset value as in the information processing device 10. The operation then moves on to step S215, and the same procedures as in the case where the MAC address has been used are carried out to decrypt the encrypted data and to print out the decrypted print data in steps S215 through S218.

As described above, in the printing system 1 of the second embodiment, the print data can be encrypted and then transmitted from the information processing device 10 to the printer 20, even if the MAC address is not input or acquired. In a case where the preset value is the same as that of another printer, the effect that the print data are output only to the designated printer cannot be obtained, unlike the case of using the MAC address. If users do not desire great security, however, greater usability can be obtained, as procedures such as the inputting of an MAC address can be omitted. Thus, the printing system 1 can be made more flexible.

Figure 9:
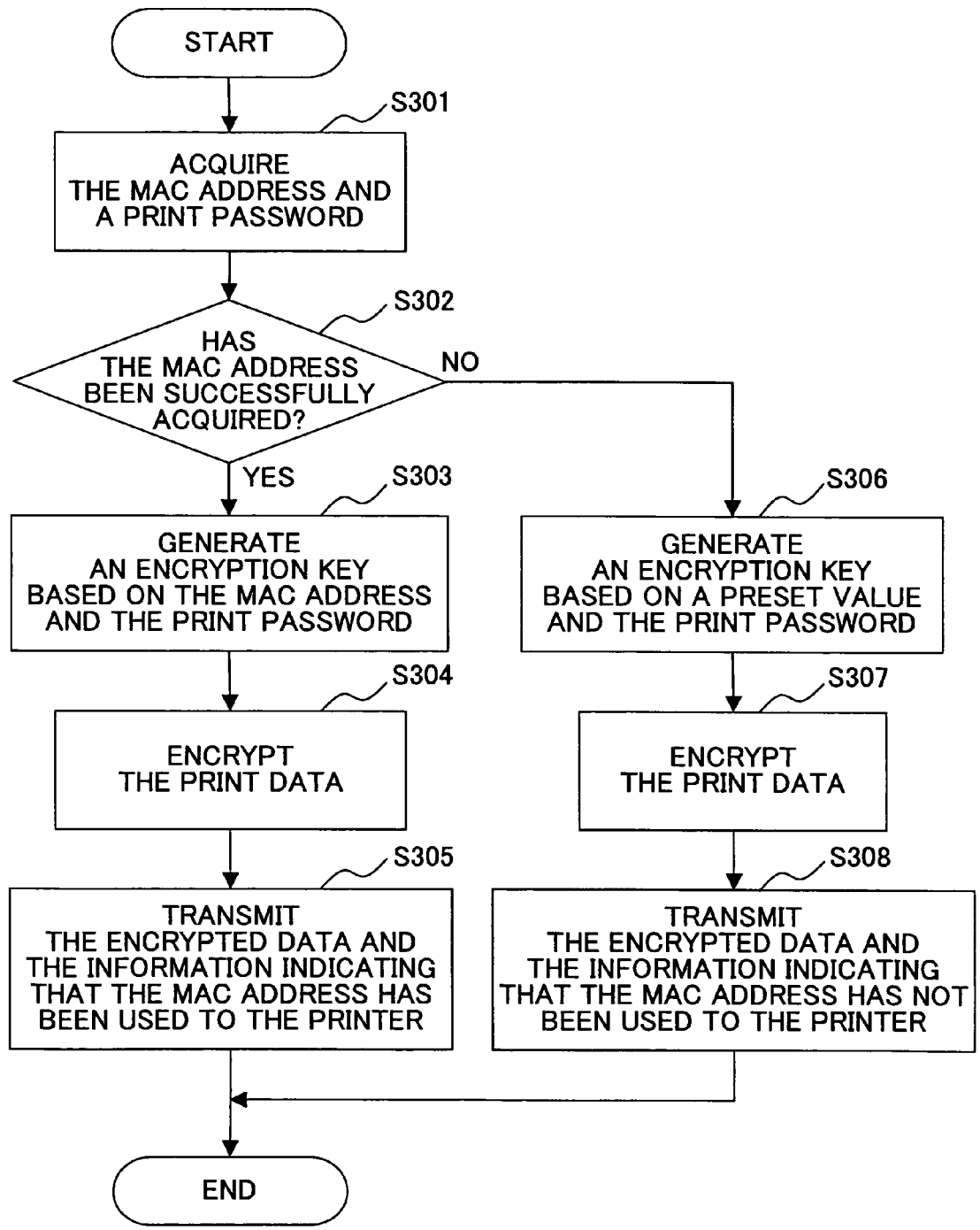
FIG. 9 is a flowchart of an operation to be performed by the information processing device in a third embodiment of the present invention.

Next, an operation to give more security is described as a third embodiment of the present invention. FIG. 9 is a flowchart of the operation to be performed by the information processing device 10 in the third embodiment. The operation shown in FIG. 9 is performed in the same timing as the operations shown in FIG. 4 or 7.

In step S301, the encryption key generating part 113 acquires the MAC address and a print password from the data accumulating part 112. Here, the print password is a character string that has been input by a user as data for generating an encryption key, together with the MAC address. The print password should be input by a user through the input screen that is used when the MAC address is input.

Figure 10:
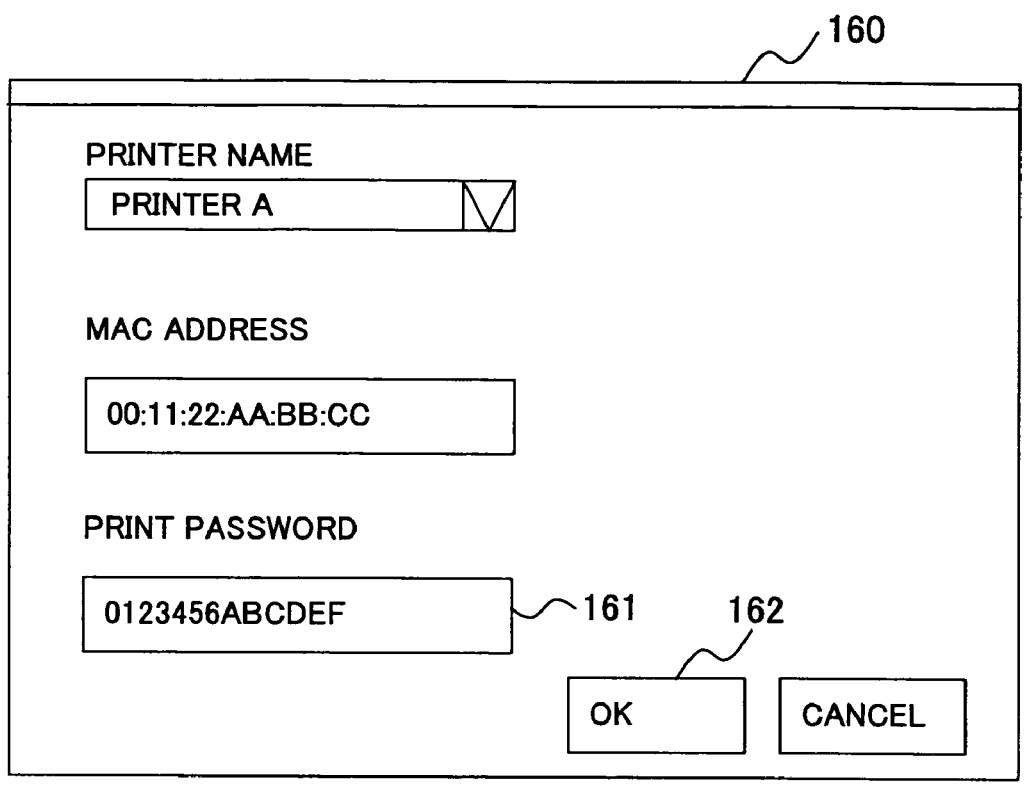
FIG. 10 shows an example of the input screen in the third embodiment.

FIG. 10 shows an example of the input screen in the third embodiment. The input screen 160 shown in FIG. 10 is the same as the input screen 150 shown in FIG. 5, except that a print password input area 161 to be used to input a print password is added. When a user inputs a MAC address and a print password, and clicks an OK button 162 on the input screen 160, the MAC address and the print password are stored in the data accumulating part 112.

The procedures of step S302 and later are the same as the procedures of steps S202 through S208 (FIG. 8) of the second embodiment, except for the encryption key generating process (steps S303 and S306). In the operation shown in FIG. 9, the encryption key generating part 113 generates an encryption key based on the MAC address and the print password in step S303, with the MAC address having been successfully acquired. In the case where the MAC address has not been successfully acquired, the encryption key generating part 113 generates an encryption key based on the preset value and the print password in step S306.

In generating an encryption key based on a MAC address/preset value and a print password, the combined data of the MAC address/preset value and the print password may be converted into 128-bit data by MD5, and the first 56 bits of the 128-bit data may be cut off and used as an encryption key.

Figure 11:
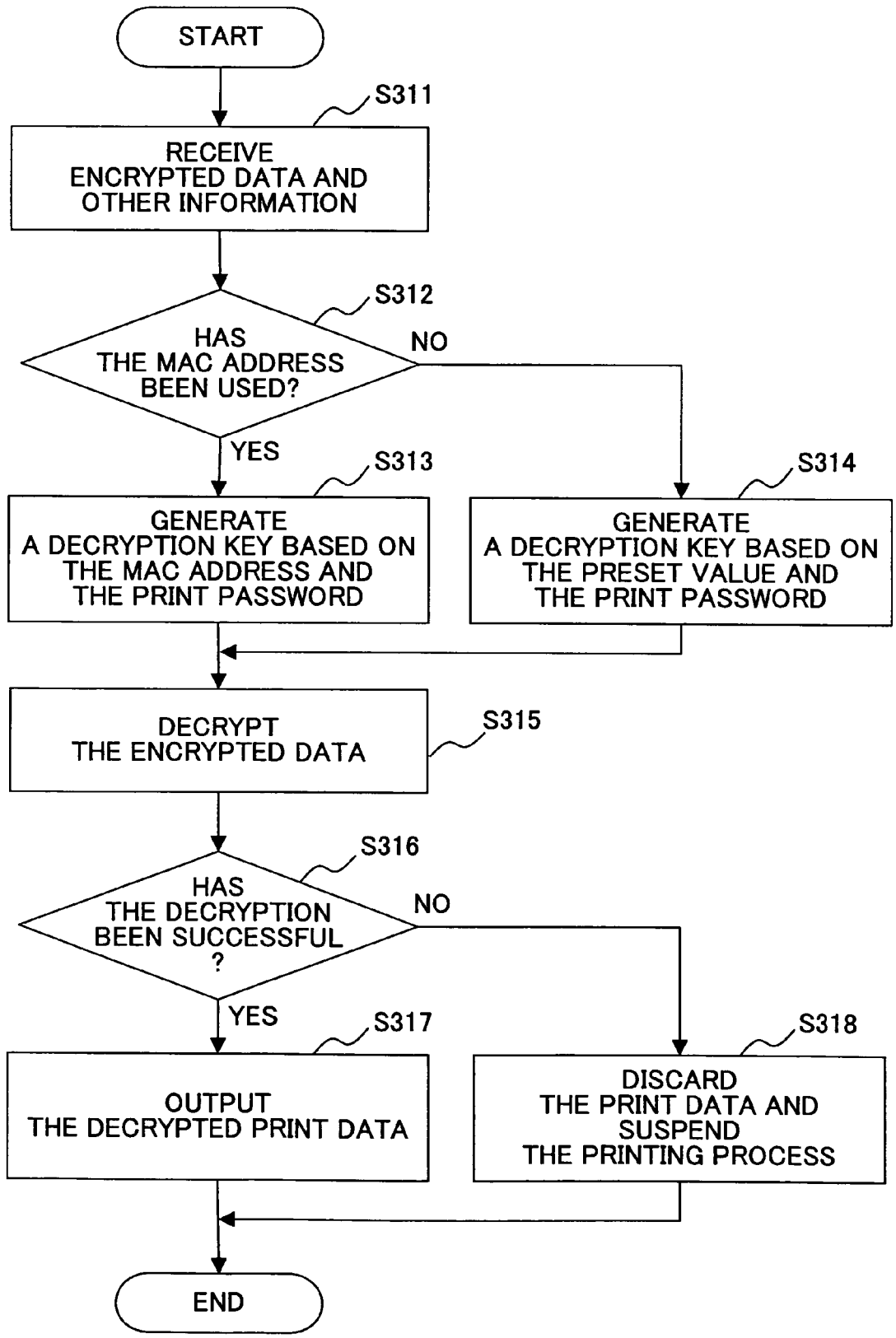
FIG. 11 is a flowchart of an operation to be performed by the printer in the third embodiment.

Next, the operation to be performed by the printer 20 is described. FIG. 11 is a flowchart of the operation to be performed by the printer 20 in the third embodiment of the present invention.

The operation shown in FIG. 11 is the same as the operation shown in FIG. 8 of the second embodiment, except for the encryption key generating process (steps S313 and S314). In the operation shown in FIG. 11, the decryption key generating part 23 generates a decryption key based on the MAC address and the same print password as in the information processing device 10 in step S313, with the MAC address having been used in generating the encryption key in the information processing device 10. In the case where the MAC address has not been used to generate the encryption key in the information processing device 10, the decryption key generating part 23 generates a decryption key based on the preset value and the print password in step S314.

This technique of generating a decryption key based on a MAC address/preset value and a print password is the same as the corresponding technique used to generate an encryption key in the information processing device 10. Accordingly, the decryption key generated by the decryption key generating part 23 is the same as the encryption key generated by the encryption key generating part 113 of the information processing device 10, as long as the same print password as the print password used in the information processing device 10 is input to the printer 20.

Figure 12:
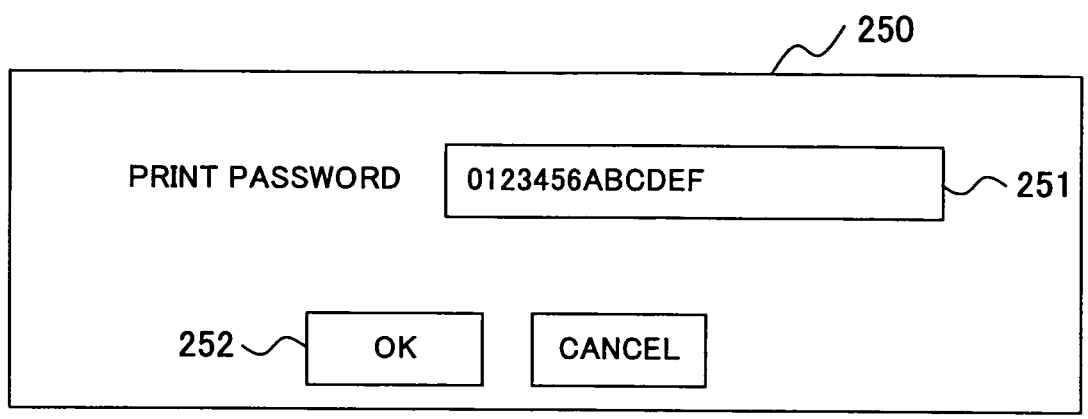
FIG. 12 shows an example of the input screen for inputting a print password in the printer.

The print password in the printer 20 should be input by a user through the input screen that is displayed on the operation panel by the UI part 21. FIG. 12 shows an example of the input screen for inputting a print password into the printer 20. The input screen 250 shown in FIG. 12 has a print password input area 251 through which a print password is to be input. When a user inputs a print password with the same value as the print password used in the information processing device 10 into the print password input area 251, and clicks an OK button 252, the print password is stored in the data accumulating part 22.

As described above, in the printing system 1 of the third embodiment, not only a MAC address that is static information but also a print password that is dynamic information is used as the information for generating an encryption/decryption key. Accordingly, a system with more security can be structured.

If an encryption or decryption key is generated based only on static information such as a MAC address, the encrypted data might be decrypted by acquiring the MAC address of the printer 20 and the algorithm for generating the encryption or decryption key. Dynamic information such as a print password, on the other hand, is difficult for a third party to identify, and thus, decrypting the encrypted data can be made more difficult.

In the third embodiment, if a password is not set in both the information processing device 10 and the printer 20, the same operation as the operation of the second embodiment should be performed to smoothly print out the print data.

Meanwhile, an application program such as Adobe Acrobat Reader (copyright) prompts a user to input a password to prevent others from reading the contents of a document (the password will be hereinafter referred to as the "document password"). Based on the document password, document data (PDF data) are encrypted and stored. In a case where the encrypted document data are stored in a user terminal, the document data decrypted in the user terminal are transmitted to a printer, thereby putting the plain text on the network, which is not desirable for security reasons.

To counter this problem, encrypted document data are transmitted to a printer and then decrypted in the printer. However, the document password used in the encryption is also necessary in decrypting the encrypted document data. Therefore, the document password and the encrypted document data need to be transmitted to the printer.

However, if the user terminal transmits the document password as plain text to the printer, the encryption of the document data becomes pointless. Once the document password is stolen, the encrypted document data can be easily decrypted.

To counter this problem, the security level in handling document data should be increased. In the following, an operation to give more security by applying the present invention to document data encrypted with a password is described as a fourth embodiment of the present invention.

Figure 13:
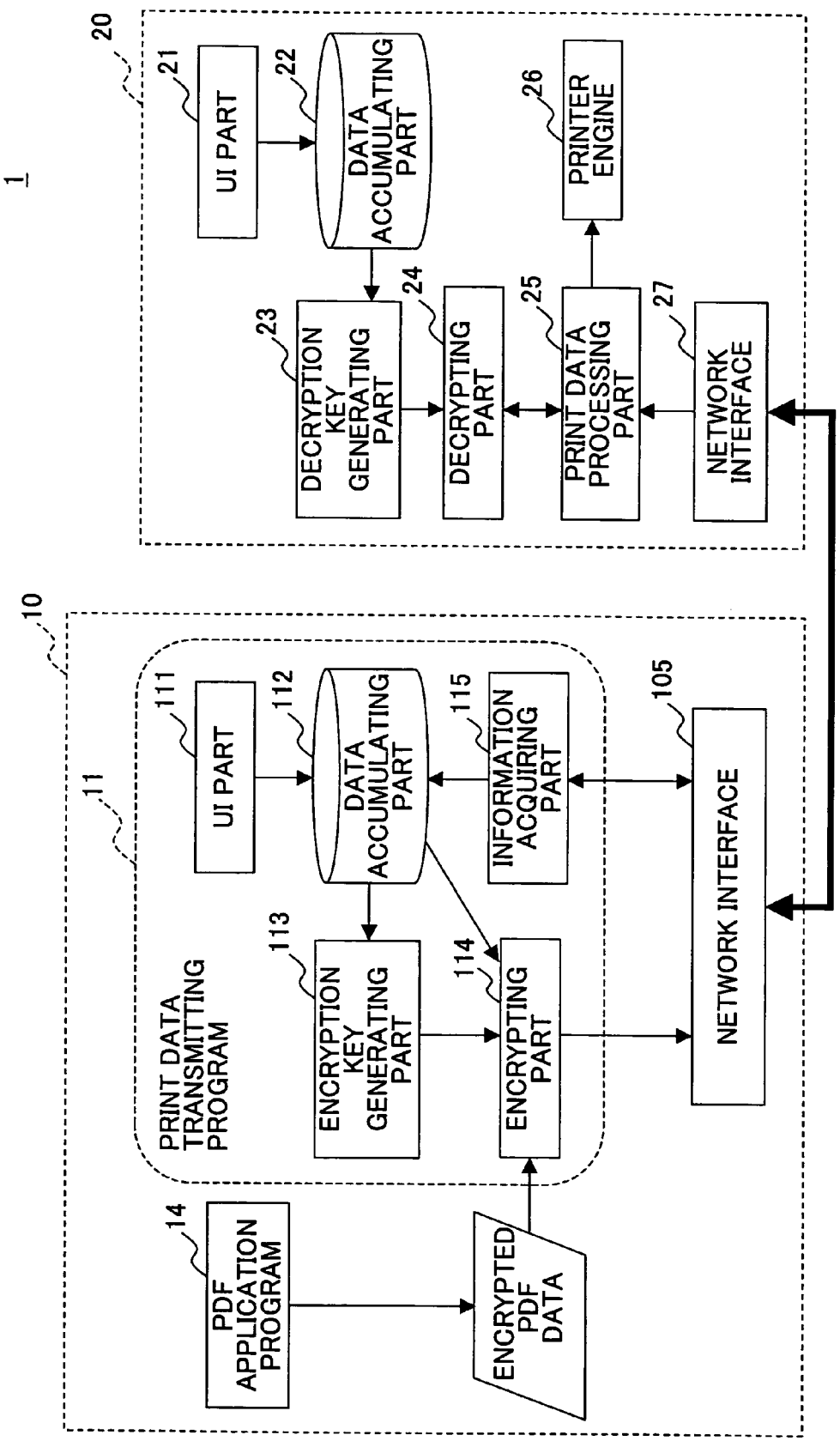
FIG. 13 illustrates an example functional structure of the printing system in a fourth embodiment of the present invention.

FIG. 13 illustrates an example functional structure of a printing system as a fourth embodiment of the present invention. In FIG. 13, the same components as those shown in FIG. 3 are denoted by the same reference numerals as those in FIG. 3, and explanation of them is omitted. In the fourth embodiment, PDF data are used as document data.

The functions of the information processing device 10 shown in FIG. 13 are substantially the same as those shown in FIG. 3, except for the operation of the encrypting part 114. In the fourth embodiment, the encrypting part 114 encrypts a document password stored in the data accumulating part 112, instead of print data. The document password is a password that is used to encrypt PDF data by a PDF application program 14 such as Acrobat Reader that can cope with PDF data.

The printer 20 is also substantially the same as the printer 20 shown in FIG. 3, except that the print data processing part 25 of the fourth embodiment can process PDF data.

Figure 14:
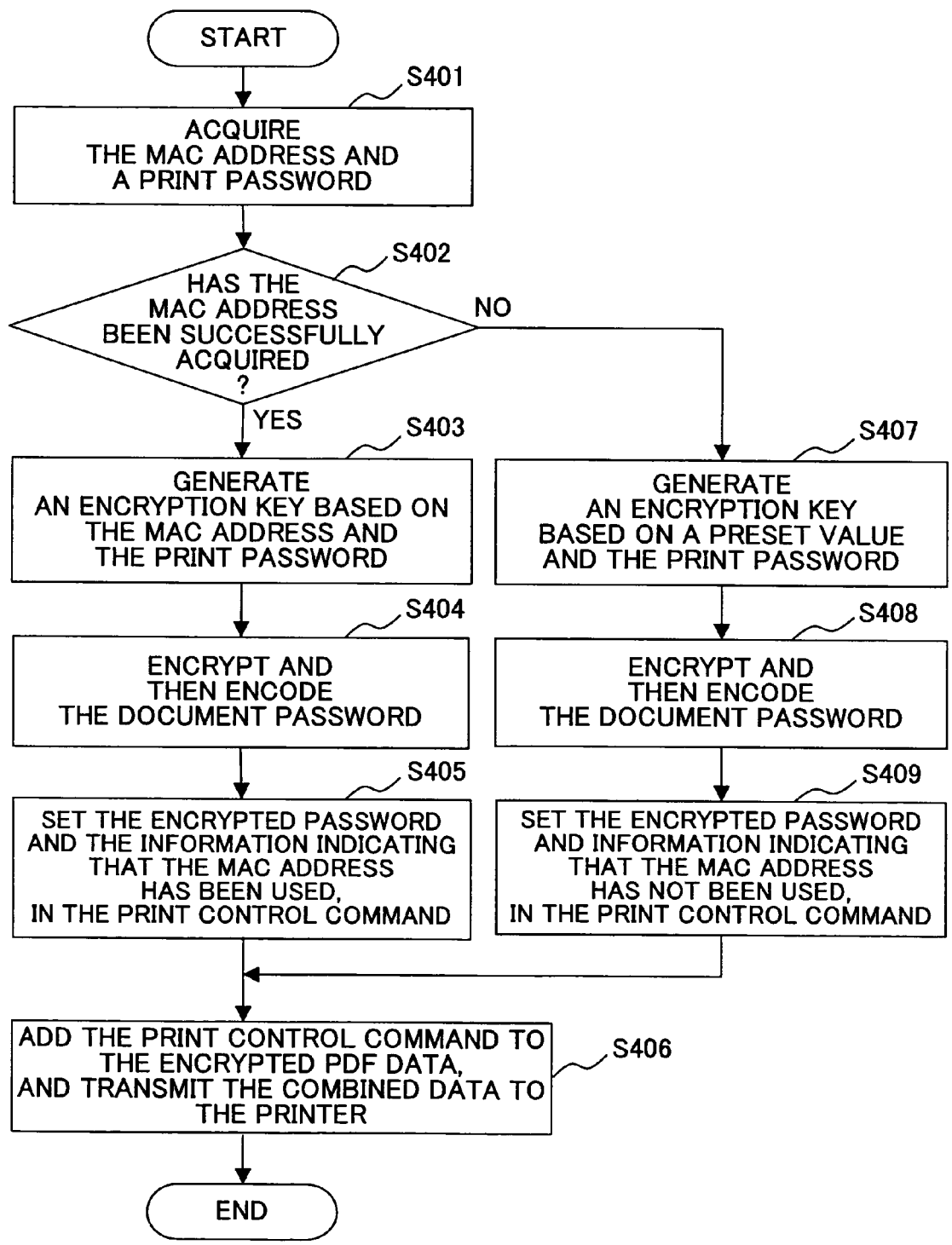
FIG. 14 is a flowchart of an operation to be performed by the information processing device in the fourth embodiment.

In the following, the operation procedures to be carried out in the printing system 1 shown in FIG. 13 are described. FIG. 14 is a flowchart of an operation to be performed by the information processing device 10 in the fourth embodiment.

The procedures of steps S401 through S403 in FIG. 14 are the same as steps S301 through S303 in FIG. 9. More specifically, the encryption key generating part 113 acquires the MAC address and a print password from the data accumulating part 112 in step S401. The encryption key generating part 113 then determines whether the MAC address has been successfully acquired in step S402. In the case where the MAC address has been successfully acquired, the encryption key generating part 113 generates an encryption key, based on the MAC address and the print password in step 403.

The operation then moves on to step S404. In step S404, the encrypting part 114 obtains a document password from the data accumulating part 112, and then encrypts the document password, using the encryption key generated by the encryption key generating part 113. Further, the encrypting part 114 encodes the encrypted document password (hereinafter referred to as the "encrypted password") into text data by Base64.

The document password should be input by a user through the input screen that is used when the MAC address is input.

FIG. 15 shows an example of the input screen in the fourth embodiment. The input screen 170 shown in FIG. 15 is the same as the input screen 160 shown in FIG. 10, except that a document password input area 171 for inputting a document password is added. When a user inputs a MAC address, a print password, and a document password, and clicks an OK button 172 on the input screen 170, the MAC address, the print password, and the document password are stored in the data accumulating part 112.

After step S404, the operation moves on to step S405. In step S405, the encoded encrypted password and the information indicating that the MAC address has been used to generate the encryption key are set in a print control command that is included in data to be transmitted to the printer 20. The information will be hereinafter referred to as the "MAC address use flag".

Figure 16:
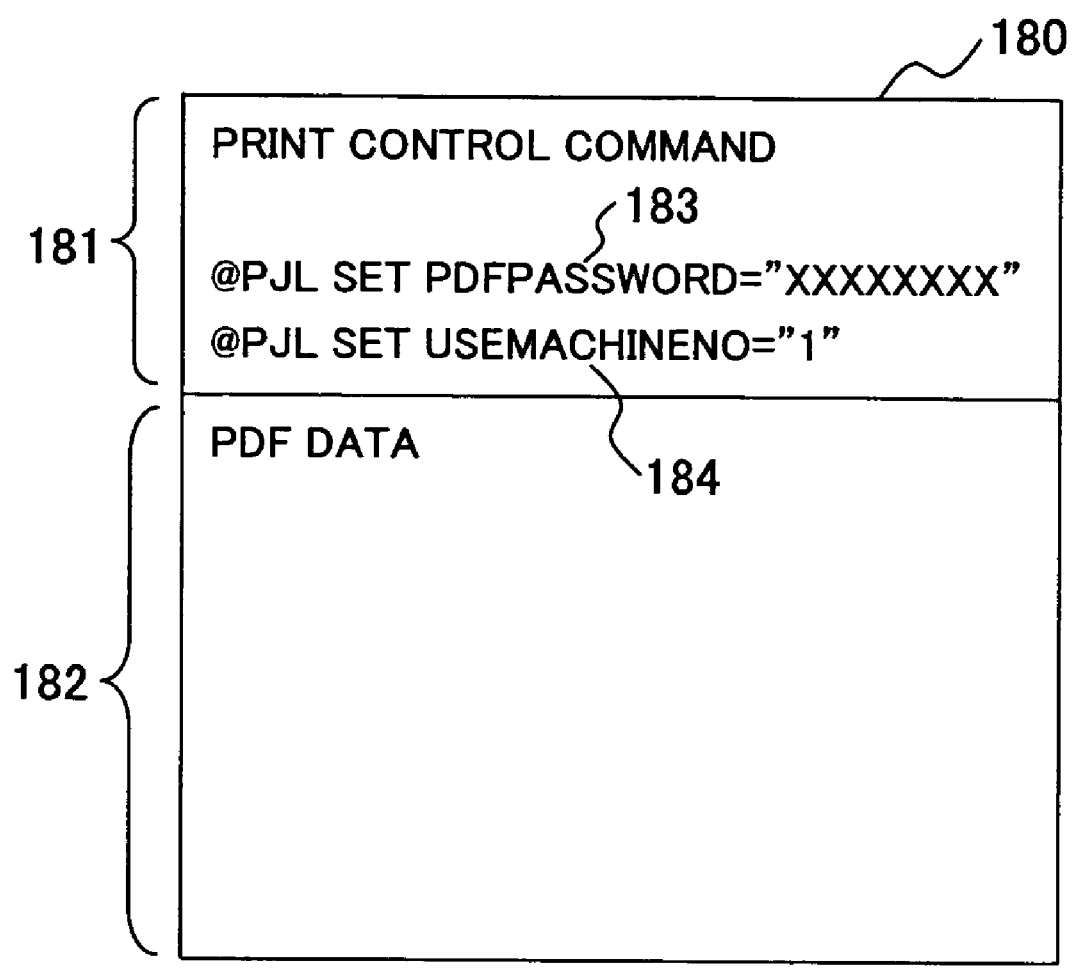
FIG. 16 shows an example format of transmission data to be transmitted to the printer.

FIG. 16 shows an example format of the data to be transmitted to the printer 20. As shown in FIG. 16, the transmission data 180 have a print control command 181 of PJL (Printer Job Language) added to PDF data 182.

In the example shown in FIG. 16, the PJL is designed especially to set an encrypted password and the MAC address use flag. The PDFPASSWORD command denoted by reference numeral 181 is a PJL command for setting an encrypted password. Since binary data cannot be transmitted with a PJL command, an encoded encrypted password should be set here.

The USEMACHINENO command denoted by reference numeral 184 is a PJL command for setting the MAC address use flag. If "1" is set in the USEMACHINENO command, the MAC address has been used to generate the encryption key. If "0" is set, the MAC address has not been used to generate the encryption key.

In this manner, suitable values are set in the PDFPASSWORD command and the USEMACHINENO command in step S405.

The operation then moves on to step S406. In step S406, the encrypting part 114 generates transmission data that have the print control command added to the encrypted PDF data that have been encrypted and stored beforehand by the PDF application program 14. The encrypting part 114 then transmits the transmission data to the printer 20.

In the case where the MAC address has not been successfully acquired ("No" in step S402), the operation moves on to step S407. In step S407, the encryption key generating part 113 generates an encryption key based on a preset value, instead of the MAC address. The operation then moves on to step S408. In step S408, the encrypting part 114 encrypts the document password, using the encryption key, and encodes the encrypted password.

The operation next moves on to step S409. In step S409, the encrypting part 114 sets the encoded encrypted password and the MAC address use flag in the print control command. The MAC address use flag indicates that the MAC address has been used to generate the encryption key.

After step S409, the operation moves on to step S406. In step S406, the encrypting part 114 generates transmission data that have the print control command added to the encrypted PDF data, and transmit the transmission data to the printer 20.

Figure 17:
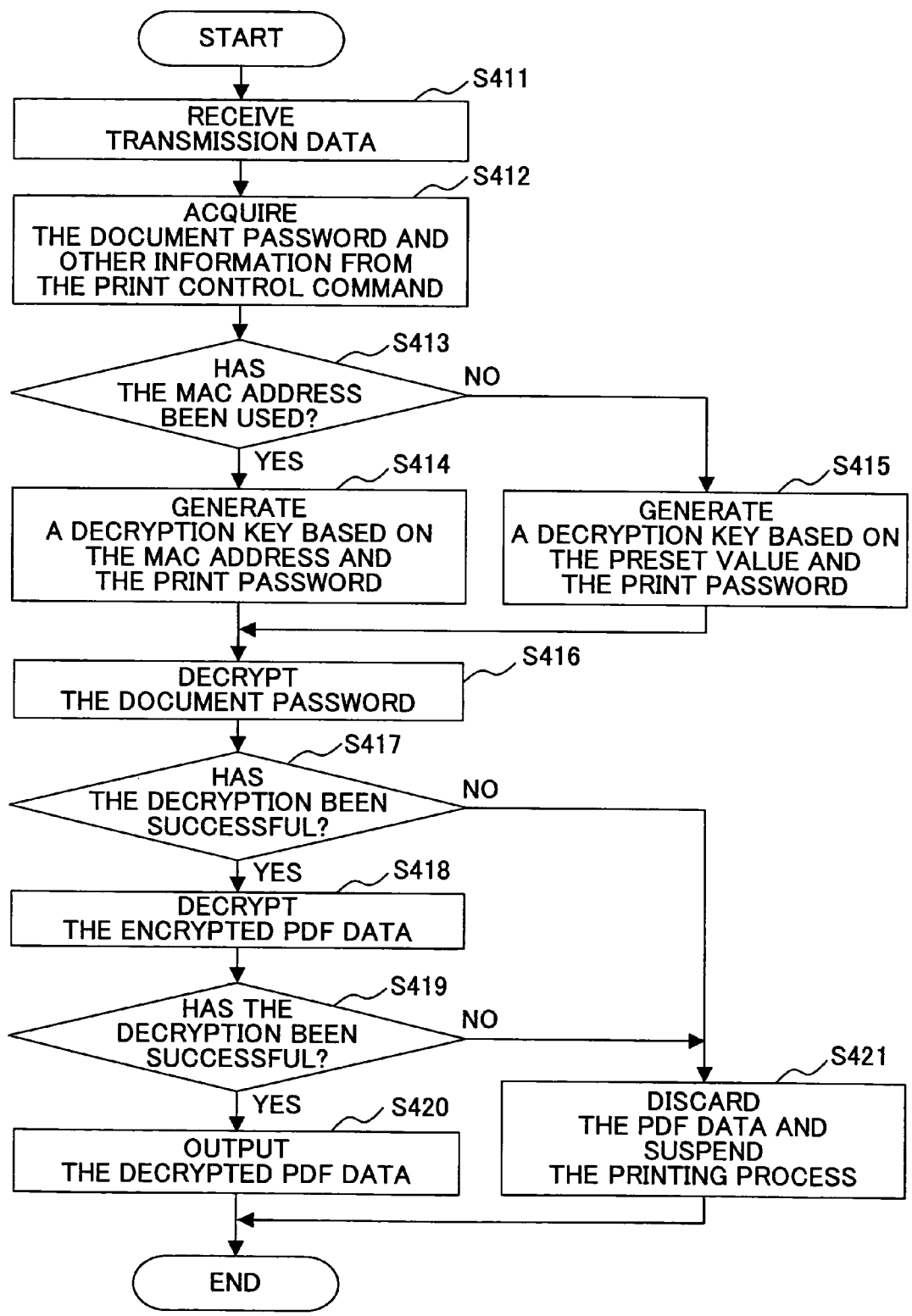
FIG. 17 is a flowchart of an operation to be performed by the printer in the fourth embodiment.

Next, the operation to be performed by the printer 20 is described. FIG. 17 is a flowchart of the operation to be performed by the printer 20 in the fourth embodiment.

In step S411, the print data processing part 25 receives the transmission data, which are transmitted from the information processing device 10 in step S406, via the network interface 27. In step S412, the print data processing part 25 acquires the value of the PDFPASSWORD command and the value of the USEMACHINENO command from the print control command included in the transmission data.

The operation then moves on to step S413. In step S413, the print data processing part 25 determines whether the MAC address has been used to generate the encryption key, based on the value of the USEMACHINENO command.

In the case where the MAC address has been used, the decryption key generating part 23 generates a decryption key, based on the MAC address and the print password in step S414. In the case where the MAC address has not been used, the decryption key generating part 23 generates a description key, based on the preset value and the print password in step S415.

After step S414 or S415, the operation moves on to step S416. In step S416, the decrypting part 24 decodes the encrypted password set as the value of the PDFPASSWORD command, thereby converting the encrypted password into binary data. The decrypting part 24 then decrypts the encrypted data as the binary data, using the decryption key. Thus, the plain text document password as text can be obtained.

After step S416, the operation moves on to step S417. In step S417, the print data processing part 25 determines whether the decryption of the encrypted password has been successful. In the case where the decryption of the encrypted password has been successful, the operation moves on to step S418. In step S418, the print data processing part 25 decrypts the encrypted PDF data included in the transmission data, using the decrypted document password. By doing so, the plain text PDF data can be obtained.

The operation then moves on to step S419. In step S419, the print data processing part 25 determines whether the decryption of the encrypted PDF data has been successful. In the case where the decryption of the encrypted PDF data has been successful, the operation moves on to step S420. In step S420, the print data processing part 25 causes the printer engine 26 to print out the decrypted PDF data.

In the case where the decryption of the encrypted password has failed ("No" in step S417), or where the decryption of the encrypted PDF data has failed ("No" in step S419), the print data processing part 25 discards the PDF data, and suspends the printing process in step S421.

Even if a document password is stolen in the printing system 1 of the fourth embodiment, the corresponding document data that are encrypted with the document password are difficult to decrypt, because the document password is also encrypted.

In each of the first through fourth embodiments described so far, an encryption/decryption key is generated based on the MAC address of the printer 20. However, the information for generating an encryption/decryption key is not limited to the MAC address.

In short, one of the effects of the present invention is to make encrypted information difficult for any other device or machine to decrypt, except the designated printer. To achieve this effect, the information for generating an encryption/decryption key should be the information inherent in the designated printer, including the machine number, the PI address, the name of the printer, or the like.

To maintain the security of the system, however, the inherent information should preferably be fixed values such as the MAC address or the machine number, rather than the IP address or the printer name that can be freely changed.

It should be noted that the present invention is not limited to the embodiments specifically disclosed above, but other variations and modifications may be made without departing from the scope of the present invention.

This patent application is based on Japanese Priority Patent Application No. 2003-330578, filed on Sep. 22, 2003, the entire contents of which are hereby incorporated by reference.

What is claimed is:

1. An information processing device configured to transmit print data to a printing device that is connected to the information processing device via a network, comprising:
   an encryption key generating part configured to generate an encryption key to be used to encrypt the print data, based on inherent information that is unique to the printing device and is represented by a fixed value; and
   an encrypting part configured to encrypt at least part of the print data, using the encryption key generated by the encryption key generating part, the print data encrypted by the encrypting part being transmitted to the printing device, wherein
   when the inherent information is not recognized, the encryption key generating part is configured to generate the encryption key based on a preset value, and
   the information processing device is configured to transmit the encrypted print data and information indicating that the inherent information has not been used to generate the encryption key, to the printing device.

2. The information processing device as claimed in claim 1, wherein the encryption key is not transmitted to the printing device.

3. The information processing device as claimed in claim 1, further comprising an information acquiring part configured to request the printing device to transmit the inherent information, and to receive the inherent information from the printing device.

4. The information processing device as claimed in claim 1, further comprising an input receiving part configured to receive a character string input by a user,
   wherein the encryption key generating part is configured to generate the encryption key, based on the inherent information and the character string received by the input receiving part.

5. The information processing device as claimed in claim 4, wherein, when the inherent information is not recognized, the encryption key generating part is configured to generate the encryption key based on the preset value and the character string received by the input receiving part.

6. The information processing device as claimed in claim 1, wherein the inherent information is a MAC address of the printing device.

7. The information processing device as claimed in claim 1, wherein:
   the print data are document data that have been encrypted with a restraining character string to restrain others from accessing the document data;
   the encrypting part is configured to encrypt the restraining character string; and
   the document data and the restraining character string encrypted by the encrypting part are transmitted to the printing device.

8. The information processing device as claimed in claim 7, wherein the document data are PDF data.

9. The information processing device as claimed in claim 7, wherein:
   the encrypted restraining character string is set in a print control command; and
   the print control command is added to the document data, and is then transmitted to the printing device.

10. A printing device configured to receive encrypted print data and information indicating whether inherent information has been used to generate an encryption key used to encrypt the print data from an information processing device connected to the printing device via a network, and to print out the printing data, the printing device comprising:
    a decryption key generating part configured to generate a decryption key to be used to decrypt the encrypted print data, based on the inherent information that is unique to the printing device and is represented by a fixed value; and
    a decrypting part configured to decrypt the encrypted print data, using the decryption key generated by the decryption key generating part, the print data decrypted by the decrypting part being printed out, wherein
    when the information indicates that the inherent information has not been used, the decryption key generating part is configured to generate the decryption key based on a preset value.

11. The printing device as claimed in claim 10, further comprising an input receiving part configured to receive a character string input by a user,
    wherein the decryption key generating part is configured to generate the decryption key, based on the inherent information and the character string received by the input receiving part.

12. The printing device as claimed in claim 11, wherein, when the information indicates that the inherent information has not been used, the decryption key generating part is configured to generate the decryption key based on the preset value and the character string received by the input receiving part.

13. The printing device as claimed in claim 10, wherein the inherent information is a MAC address of the printing device.

14. The printing device as claimed in claim 10, wherein:
    when document data that have been encrypted with a restraining character string to restrain others from accessing the document data, and the restraining character string are received from the information processing device,
    the decrypting part is configured to decrypt the restraining character string, and to further decrypt the document data based on the decrypted restraining character string; and
    the decrypted document data are printed out.

15. The printing device as claimed in claim 14, wherein the document data are PDF data.

16. A print data transmission method that is performed by an information processing device to transmit print data to a printing device connected to the information processing device via a network, the method comprising the steps of:
    generating an encryption key to be used to encrypt the print data, based on inherent information that is unique to the printing device and is represented by a fixed value;
    encrypting at least part of the print data, using the generated encryption key; and
    transmitting the encrypted print data to the printing device, wherein
    when the inherent information is not recognized, the encryption key generating step includes generating the encryption key based on a preset value, and
    the transmitting step includes transmitting the encrypted print data and information indicating that the inherent information has not been used to generate the encryption key.

17. The print data transmission method as claimed in claim 16, wherein the transmitting step does not include transmitting the encryption key to the printing device.

18. The print data transmission method as claimed in claim 16, wherein the encryption key generating step includes generating the encryption key based on the inherent information and a character string input by a user.

19. The print data transmission method as claimed in claim 16, wherein the inherent information is a MAC address of the printing device.

20. The print data transmission method as claimed in claim 16, wherein:
   the print data are document data that have been encrypted with a restraining character string to restrain others from accessing the document data;
   the encrypting step includes encrypting the restraining character string; and
   the transmitting step includes transmitting the document data and the encrypted restraining character string to the printing device.

21. The print data transmission method as claimed in claim 20, wherein the document data are PDF data.

22. A printing method that is performed by a printing device to print out print data that are encrypted and transmitted from an information processing device connected to the printing device via a network, the method comprising the steps of:
   generating a decryption key to be used to decrypt the encrypted print data transmitted from the information processing device, based on inherent information that is unique to the printing device and is represented by a fixed value;
   decrypting the encrypted print data, using the generated decryption key; and
   printing out the decrypted print data, wherein
   when information indicating that the inherent information has not been used to encrypt the print data is transmitted as well as the encrypted print data, the decryption key generating step includes generating the decryption key based on a preset value.

23. The printing method as claimed in claim 22, wherein the decryption key generating step includes generating the decryption key based on the inherent information and a character string input by a user.

24. The printing method as claimed in claim 22, wherein the inherent information is a MAC address of the printing device.

25. The printing method as claimed in claim 22, wherein:
   when the printing device receives document data that have been encrypted with a restraining character string to restrain others from accessing the document data, and the restraining character string that has also been encrypted,
   the decrypting step includes decrypting the restraining character string;
   the printing method further comprising the step of decrypting the document data with the decrypted restraining character string; and
   the printing step includes printing out the decrypted document data.

26. The printing method as claimed in claim 25, wherein the document data are PDF data.

27. A computer-readable storage medium storing a computer program which, when executed by a computer, causes the computer to perform a print data transmitting process, said computer being coupled to a printing device via a network, said print data transmitting process comprising:
   generating an encryption key to be used to encrypt print data, based on inherent information that is unique to the printing device and is represented by a fixed value;
   encrypting at least part of the print data, using the generated encryption key; and
   transmitting the encrypted print data to the printing device, wherein
   when the inherent information is not recognized, the encryption key generating step includes generating the encryption key based on a preset value, and
   the transmitting step includes transmitting the encrypted print data and information indicating that the inherent information has not been used to generate the encryption key, to the printing device.

28. A computer readable recording medium storing a print data transmitting computer program for causing an information processing device that is connected to a printing device via a network, to perform a method comprising:
   generating an encryption key to be used to encrypt print data, based on inherent information that is unique to the printing device and is represented by a fixed value;
   encrypting at least part of the print data, using the generated encryption key; and
   transmitting the encrypted print data to the printing device, wherein
   when the inherent information is not recognized, the encryption key generating step includes generating the encryption key based on a preset value, and
   the transmitting step includes transmitting the encrypted print data and information indicating that the inherent information has not been used to generate the encryption key, to the printing device.

* * * * *